(12) United States Patent
Kim et al.

(10) Patent No.: US 11,938,637 B2
(45) Date of Patent: Mar. 26, 2024

(54) ROBOT AND CONTROL METHOD THEREOF

(71) Applicant: SAMSUNG ELECTRONICS CO., LTD., Suwon-si (KR)

(72) Inventors: Joonyoung Kim, Suwon-si (KR); Hyunjoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 456 days.

(21) Appl. No.: 17/424,247

(22) PCT Filed: Jan. 7, 2020

(86) PCT No.: PCT/KR2020/000227
§ 371 (c)(1),
(2) Date: Jul. 20, 2021

(87) PCT Pub. No.: WO2020/153628
PCT Pub. Date: Jul. 30, 2020

(65) Prior Publication Data
US 2022/0152828 A1    May 19, 2022

(30) Foreign Application Priority Data
Jan. 22, 2019   (KR) .......................... 10-2019-0008025

(51) Int. Cl.
*B25J 9/16*      (2006.01)
*B25J 13/00*    (2006.01)

(52) U.S. Cl.
CPC ............. *B25J 9/1666* (2013.01); *B25J 9/162* (2013.01); *B25J 9/1633* (2013.01); *B25J 9/1697* (2013.01); *B25J 13/003* (2013.01)

(58) Field of Classification Search
CPC ........ B25J 9/1666; B25J 9/162; B25J 9/1633; B25J 9/1697; B25J 13/003; B25J 11/00;
(Continued)

(56) References Cited

U.S. PATENT DOCUMENTS

| 9,043,025 B2 | 5/2015 | Brooks et al. |
| 9,623,564 B2 | 4/2017 | Al-Shaikhi et al. |

(Continued)

FOREIGN PATENT DOCUMENTS

| JP | 3872387 | 1/2007 |
| JP | 2012-111011 | 6/2012 |

(Continued)

OTHER PUBLICATIONS

International Search Report for PCT/KR2020/000227, with English translation, dated Apr. 22, 2020, 5 pages.

(Continued)

*Primary Examiner* — Adam R Mott
*Assistant Examiner* — Alyzia N Dilworth
(74) *Attorney, Agent, or Firm* — Nixon & Vanderhye, P.C.

(57) ABSTRACT

Disclosed is a robot. The robot comprises: a driving unit including a motor, and a processor configured to: determine a driving level of the robot based on surrounding environment information of the robot based on receiving a command for performing a task of the robot, determine, based on information about a maximum allowable torque and information about a maximum allowable speed which are preset for each driving level, a maximum allowable torque and a maximum allowable speed corresponding to the driving level of the robot, calculate the maximum allowable acceleration of the robot based on the maximum allowable torque, control the driving unit to control the robot to control the moving speed of the robot to reach the maximum allowable speed based on the maximum allowable acceleration, and control the robot to perform tasks while the robot is moving at the maximum allowable speed.

8 Claims, 9 Drawing Sheets

(58) Field of Classification Search
CPC . B25J 5/007; B25J 9/161; B25J 9/1664; B25J 19/023; B25J 19/026; G05D 1/0223; G05D 2201/0215

See application file for complete search history.

(56) References Cited

U.S. PATENT DOCUMENTS

| | | |
|---|---|---|
| 9,694,497 B2 | 7/2017 | Burmeister et al. |
| 10,035,270 B2 | 7/2018 | Fay et al. |
| 10,065,316 B2 | 9/2018 | Sussman et al. |
| 2006/0196003 A1 | 9/2006 | Song et al. |
| 2016/0299509 A1 | 10/2016 | Ueda et al. |
| 2017/0225321 A1 | 8/2017 | Deyle et al. |
| 2022/0197293 A1* | 6/2022 | Thybo .................. G05D 1/0061 |

FOREIGN PATENT DOCUMENTS

| | | |
|---|---|---|
| JP | 5308840 | 10/2013 |
| JP | 5464514 | 4/2014 |
| JP | 5842245 | 1/2016 |
| JP | 6071839 | 2/2017 |
| KR | 10-2003-0093643 | 12/2003 |
| KR | 10-2011-0011424 | 2/2011 |
| KR | 10-2014-0086245 | 7/2014 |
| KR | 10-2018-0038870 | 4/2018 |

OTHER PUBLICATIONS

Written Opinion of the ISA for PCT/KR2020/000227, with English translation, dated Apr. 22, 2020, 7 pages.

\* cited by examiner

FIG. 2

|  | DRIVING LEVEL |
|---|---|
| Living Room | 1 |
| Kitchen | 2 |
| Room 1 | 3 |
| Room 2 | 3 |
| Room 3 | 5 |

FIG. 3

|  | MAXIMUM ALLOWABLE TORQUE (N·m) | MAXIMUM ALLOWABLE SPEED (m/sec) |
|---|---|---|
| DRIVING LEVEL 1 | 100 | 5 |
| DRIVING LEVEL 2 | 80 | 4 |
| DRIVING LEVEL 3 | 60 | 3 |
| DRIVING LEVEL 4 | 40 | 2 |
| DRIVING LEVEL 5 | 20 | 1 |

FIG. 5

|  | DRIVING LEVEL |
|---|---|
| CLEANING | 3 |
| MOVING OBJECT | 2 |
| USER MOVEMENT | 5 |
| SECURITY | 2 |

FIG. 6

|        | DRIVING LEVEL |
|--------|---------------|
| USER A | 1             |
| USER B | 2             |
| USER C | 5             |
| USER D | 3             |

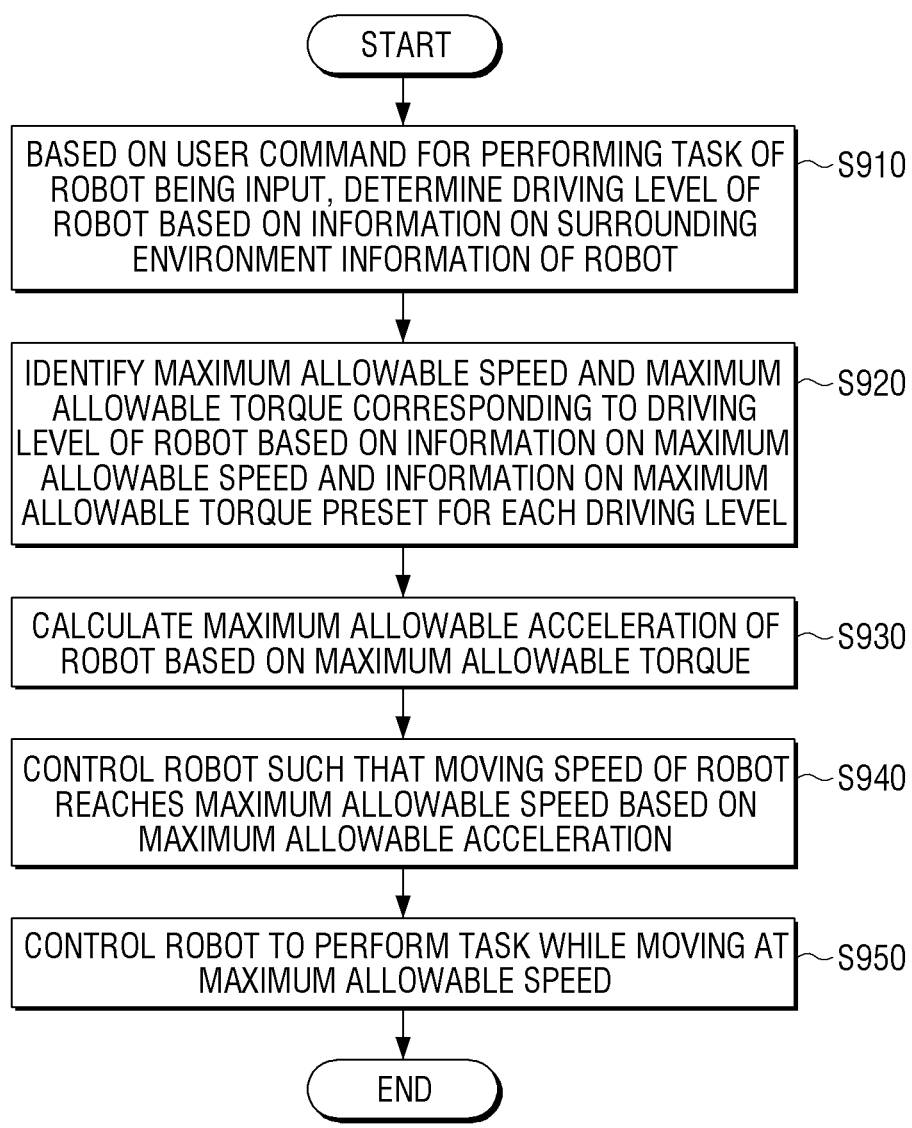

ROBOT AND CONTROL METHOD THEREOF

CROSS-REFERENCE TO RELATED APPLICATIONS

This is a national stage application of International Application No. PCT/KR2020/000227, filed Jan. 7, 2020, in the Korean Intellectual Property Office, designating the United States, and claiming priority to Korean Patent Application No. 10-2019-008025, filed Jan. 22, 2019, in the Korean Intellectual Property Office, the disclosures of which are incorporated by reference herein in their entireties.

BACKGROUND

Field

The disclosure relates to a robot and a method for controlling thereof. For example, the disclosure relates to a robot for changing a moving speed and a method for controlling thereof.

Description of Related Art

With the development of electronic technology, various robots are being developed. Robots are used not only in various industrial fields, medical fields, aerospace fields, but also in regular homes.

Recently, automated guided vehicles that classify goods on behalf of people and transport goods to a destination, robot vacuum cleaners that perform cleaning while driving through indoor spaces in a home, or the like have been developed.

Meanwhile, it is common for such a robot to perform tasks while driving at a constant speed. However, if the robot performs a tasks at a preset speed in a space where the robot can drive rapidly, it may reduce work efficiency. In addition, there is a risk of collision or the like when the robot performs a task at a set speed faster than the preset speed in a space where the robot must move slowly.

SUMMARY

Embodiments of the disclosure address the problem described above, and provides a robot that controls a moving speed by itself based on a surrounding environment, and a method for controlling thereof.

According to an example embodiment, a robot includes: a driving unit including a driving motor, and a processor configured, based on a command for performing a task of the robot being received: determine a driving level of the robot based on surrounding environment information of the robot, identify, based on information on a maximum allowable torque and information on a maximum allowable speed which are preset for each driving level, the maximum allowable torque and the maximum allowable speed corresponding to the driving level of the robot, calculate a maximum allowable acceleration of the robot based on the maximum allowable torque, control the driving unit to control a moving speed of the robot to reach the maximum allowable speed based on the maximum allowable acceleration, and control the robot to perform tasks while the robot is moving at the maximum allowable speed.

The surrounding environment information of the robot may include information on a space where the robot is located, and the processor may be configured to, based on information on a driving level for each space, identify a driving level corresponding to a space where the robot is located, and determine the identified driving level as a driving level of the robot.

The processor may be configured, based on information on a driving level for each task type, to: identify a driving level corresponding to a task being performed by the robot, and determine a relatively high driving level as the driving level of the robot, from among the driving level corresponding to the space where the robot is located and the driving level corresponding to the task being performed by the robot.

The processor may be configured, based on an image captured by a camera or a voice received through a microphone: identify a user located around the robot, based on information on a driving level for each user, identify a driving level corresponding to the identified user, and determine a relatively high driving level as the driving level of the robot, from among the driving level corresponding to the space where the robot is located and a driving level corresponding to the identified user.

The processor may be configured, based on the identified user being located within a preset range from the robot, to: determine a relatively high driving level as the driving level of the robot, from among the driving level corresponding to the space where the robot is located and the driving level corresponding to the identified user, and based on the identified user being located outside the preset range from the robot, determine the driving level corresponding to the space where the robot is located as the driving level of the robot.

The processor may be configured, based on a driving direction of the robot being changed based on pre-stored map information, or based on at least one of an obstacle or a user being detected around the robot, to: change the driving direction, and control the driving unit to reduce a moving speed of the robot based on the maximum allowable acceleration while changing the driving direction.

The processor may be configured to control the driving unit such that the robot moves according to a Bezier curve while the robot changes the driving direction.

According to an example embodiment, a method for controlling a robot includes, based on receiving a command for performing a task: determining a driving level of the robot based on surrounding environment information of the robot, identifying, based on information on a maximum allowable torque and information on a maximum allowable speed which are preset for each driving level, the maximum allowable torque and the maximum allowable speed corresponding to the driving level of the robot, calculating a maximum allowable acceleration of the robot based on the maximum allowable torque, controlling the robot such that a moving speed of the robot reaches the maximum allowable speed based on the maximum allowable acceleration, and controlling the robot to perform tasks while the robot is moving at the maximum allowable speed.

The surrounding environment information of the robot may include information on a space where the robot is located, and wherein the determining the driving level may include, based on information on a driving level for each space, identifying a driving level corresponding to a space where the robot is located, and determining the identified driving level as a driving level of the robot.

The determining the driving level may include, based on information on a driving level for each task type, identifying a driving level corresponding to a task being performed by the robot, and determining a relatively high driving level as the driving level of the robot, from among the driving level corresponding to the space where the robot is located and the driving level corresponding to the task being performed by the robot.

The method may further include, based on an image captured by a camera or a voice received through a microphone, identifying a user located around the robot, wherein the determining the driving level includes, based on information on a driving level for each user, identifying a driving level corresponding to the identified user, and determining a relatively high driving level as the driving level of the robot, from among the driving level corresponding to the space where the robot is located and a driving level corresponding to the identified user.

The determining the driving level may include, based on the identified user being located within a preset range from the robot, determining a relatively high driving level as the driving level of the robot, from among the driving level corresponding to the space where the robot is located and the driving level corresponding to the identified user, and based on the identified user being located outside the preset range from the robot, determining the driving level corresponding to the space where the robot is located as the driving level of the robot.

The method may further include, based on a driving direction of the robot being changed based on pre-stored map information, or based on at least one of an obstacle or a user being detected around the robot, changing the driving direction, and reducing a moving speed of the robot based on the maximum allowable acceleration while changing the driving direction.

The method may further include controlling the robot to move according to a Bezier curve while the robot changes the driving direction.

According to various example embodiments as described above, a robot may quickly process a task within a work space. In addition, the robot may avoid collision with an obstacle or the like without having a separate sensor.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a chart illustrating example information on a driving level for each space according to various embodiments;

FIG. 3 is a chart illustrating example information on a maximum allowable torque and a maximum allowable speed preset for each driving level according to various embodiments;

FIG. 5 is a chart illustrating example information on a driving level for each type of task according to various embodiments;

FIG. 6 is a chart illustrating example information on a driving level for each user according to various embodiments;

FIG. 9 is a flowchart illustrating an example method for controlling a robot according various embodiments.

DETAILED DESCRIPTION

The terms used in the disclosure and the claims may be general terms selected in consideration of the functions of the various example embodiments of the disclosure. However, such terms may vary depending on an intention of those skilled in the art, a legal or technical interpretation, an emergence of a new technology, and the like. Some terms arbitrarily selected. Such terms may be construed according to meanings defined in the disclosure, and may also be construed based on general contents of the disclosure and a typical technical concept in the art unless the terms are not specifically defined.

In describing example embodiments, detailed description of relevant known functions or components may be omitted if it would obscure the description of the subject matter.

Various example embodiments of the disclosure will be described in greater detail below with reference to the accompanying drawings and contents described in the accompanying drawings, but the disclosure is not restricted or limited by the embodiments.

Hereinafter, various example embodiments will now be explained in detail with reference to the accompanying drawings.

Figure 1:
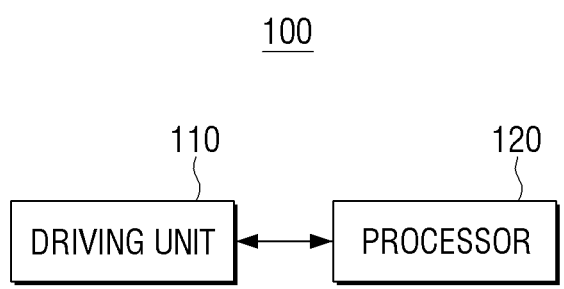
FIG. 1 is a block diagram illustrating an example configuration of a robot according to various embodiments.

FIG. 1 is a block diagram illustrating an example configuration of a robot according to various embodiments.

The robot 100 according to an embodiment may include, for example, an automated guided vehicle capable of moving an object to a destination, a robot cleaner capable of performing a cleaning operation while driving in a home space, or the like. However, the it is not limited thereto, and the robot 100 may be implemented as various robots such as, for example, and without limitation, a robot capable of purifying air while driving in a building space, a robot capable of boarding and moving a human to a destination, a housework support robot capable of organizing clothes, washing dishes while driving in a home space, a security robot capable of performing security while driving in a building space, or the like.

Referring to FIG. 1, a robot 100 according to an embodiment may include a driving unit (e.g., including a motor) 110 and a processor (e.g., including processing circuitry) 120.

The driving unit 110 may move the robot 100. For this operation, the driving unit 110 may have a driving unit such as a motor that can be connected to one or more wheels and rotate the wheels. In addition, the driving unit 110 may perform a driving operation such as moving, stopping, or changing a direction of the robot 100 according to a control signal from the processor 120.

The processor 120 may include various processing circuitry and controls the overall operations of the robot 100. The processor 120 may include, for example, and without limitation, one or more of a central processing unit (CPU), application processor (AP), communication processor (CP), dedicated processor, or the like. In addition, the processor 120 may be implemented with at least one general processor, a digital signal processor, an application specific integrated circuit (ASIC), a system on chip (SoC), a microcomputer (MICOM), or the like.

The processor 120 may determine a driving level of the robot 100 based on information on surrounding environment information of the robot 100. The surrounding environment information may include information about a space in which the robot 100 is located, and the processor 120 may identify the space in which the robot 100 is located based on pre-stored map information, and identify a driving level corresponding to the space.

For example, if the processor 120 may identify that the robot 100 is located in a living room based on the pre-stored map information, the robot 100 may determine a driving level corresponding to the living room based on driving level information for each space as a driving level of the robot 100.

Further, the processor 120 may identify a maximum allowable speed and a maximum allowable torque corresponding to the driving level of the robot 100 based on information on the maximum allowable speed and information on the maximum allowable torque which may be preset for each driving level.

Further, the processor 120 may calculate the maximum allowable acceleration of the robot 100 based on the maximum allowable torque, and control the driving unit 110 so that a moving speed of the robot 100 reaches the maximum allowable speed based on the maximum allowable acceleration.

Accordingly, the disclosure may not only perform task quickly in the corresponding space, but also perform work safely since within the maximum allowable speed.

When changing a driving direction of the robot 100 based on the pre-stored map information, the processor 120 may decrease the moving speed of the robot 100 based on the maximum allowable acceleration described above. Accordingly, a collision may be prevented and/or avoided while performing a task in a corresponding space quickly.

Hereinafter, example operation of the processor 120 will be described in greater detail with reference to FIGS. 2, 3 and 4.

FIG. 2 is a chart illustrating example information on a driving level for each space according to various embodiments.

Based on a user command for performing a task of the robot 100 being input, the processor 120 may determine a driving level of the robot 100 based on information on the surrounding environment information of the robot 100.

The surrounding environment information may include information on a space in which the robot 100 is located. For example, the processor 120 may identify a space in which the robot 100 is located based on the pre-stored map information, and may determine a driving level of the robot 100 based on the space in which the robot 100 is located.

For example, if it is identified that the space in which the robot 100 is located is a living room based on the pre-stored map information, the processor 120 may determine a driving level corresponding to the living room as the driving level of the robot 100.

For this operation, the processor 120 may use information about the pre-stored driving level for each space.

For example, referring to FIG. 2, the robot 100 may store information on a driving level for each space that a driving level corresponding to a living room is 1, a driving level corresponding to a kitchen is 2, a driving level corresponding to Room 1 and Room 2 is 5, and a driving level corresponding to Room 3 is 3.

In addition, based on a user command for performing a task of the robot 100 in the living room being input, the processor 120 may determine a driving level 1 corresponding to the living room as the driving level of the robot 100 based on the pre-stored information on the driving level for each space.

Although it has been described that information on the driving level for each space is pre-stored, this may be received from an external electronic device (not shown) such as a server (not shown), a smartphone, or the like. In addition, the information on the driving level for each space, described above, is only an example, and it may be variously set or changed according to a user command. For example, the driving level corresponding to the living room may be set to 3.

In addition, an embodiment of identifying a space in which the robot 100 is located based on pre-stored map information has been described, but this is only an example, and the robot 100 may identify a space in which the robot 100 is located by various methods, such as receiving information about a location from an external device such as a beacon, or the like.

In addition, in this case, based on a user command for performing a task being input, it has been described that the driving level of the robot 100 is determined based on the surrounding environment information, but this is only an example. When it is identified that the surrounding environment information is continuously acquired while performing a task, and the surrounding environment information has changed, the processor 120 may determine the driving level of the robot 100 based on the changed surrounding environment information. In other words, when the robot 100 is located in the kitchen according to a movement of the robot 100 while performing a task in the living room, the processor 120 may determine the driving level corresponding to the kitchen as the driving level of the robot 100.

FIG. 3 is a chart illustrating example information on a maximum allowable torque and a maximum allowable speed preset for each driving level according to various embodiments.

Based on the driving level of the robot 100 being determined, the processor 120 may identify the maximum allowable speed and the maximum allowable torque corresponding to the driving level of the robot 100 based on information on the maximum allowable torque and information on the maximum allowable speed preset for each driving level.

For this operation, the processor 120 may use pre-stored information on the maximum allowable torque and information on the maximum allowable speed preset for each driving level.

For example, referring to FIG. 3, the robot 100 may store information on the maximum allowable torque and information on the maximum allowable speed preset for each driving level that a maximum allowable torque and a maximum allowable speed corresponding to the driving level 1 may be 100 (N·m) and 5 (m/sec), respectively, a maximum allowable torque and a maximum allowable speed corresponding to a driving level 2 may be 80 (N·m) and 4 (m/sec), respectively, a maximum allowable torque and a maximum allowable speed corresponding to a driving level 3 may be 60 (N·m) and 3 (m), respectively./sec), a maximum allowable torque and a maximum allowable speed corresponding to a driving level may be 40 (N·m) and 2 (m/sec), respectively, and a maximum allowable torque and a maximum allowable speed corresponding to a driving level 5 may be 20 (N·m) and 1 (m/sec), respectively.

In addition, the processor 120 may identify the pre-stored the maximum allowable torque and the maximum allowable speed corresponding to the driving level of the robot 100 based on the information on the maximum allowable torque and the information on the maximum allowable speed preset for each driving level.

For example, based on a user command for performing a task of the robot 100 being input in the living room, the processor 120 may identify the driving level 1 corresponding to the living room, and identify the maximum allowable torque the maximum allowable speed of the robot 100 as the maximum allowable torque 100 (N·m) and the maximum allowable speed 5 (m/sec) corresponding to the driving level 1, respectively.

In addition, the processor 120 may calculate the maximum allowable acceleration of the robot 100 based on the maximum allowable torque.

For example, the processor 120 may calculate a maximum allowable acceleration corresponding to the maximum allowable torque based on a mass of the robot 100, a coefficient of friction of a surface in contact with the wheel of the robot 100, and a radius of the wheel of the robot 100. For this operation, the robot 100 may pre-store information on the mass of the robot 100 and information on the radius of the wheels of the robot 100. In addition, the robot 100 may pre-store information on the type of surface for each space and information on the coefficient of friction. Alternatively, the robot 100 may detect the surface through a sensor (not shown) and identify the coefficient of friction in contact with the wheels of the robot 100 based on information on the coefficient of friction for each surface.

Various equations may be applied to a method of calculating the maximum allowable acceleration of an object based on the maximum allowable torque.

For example, the processor 120 may calculate the maximum allowable acceleration through the following equation.

$$\tau = m(s)S'' + b(s)S'^2 + c(s)S'$$

$$(m(s) = MJ^{-1}\zeta' \, b(s) = MJ^{-1}\zeta'' + (J^{-1}\zeta')^T C(J^{-1}\zeta')$$
$$c(s) = f_v J^{-1}\zeta',$$

wherein $\zeta$: maximum allowable torque, S" maximum allowable acceleration, S': maximum allowable speed, R: a half of wheel diameter, L: distance between a wheel center and a wheel, M: inertia matrix, C: a Coriolis-centrifugal force, $f_v$: viscous coefficient of friction, $$J = \frac{R}{2}\begin{bmatrix} 1 & 1 \\ 1/L & -1/L \end{bmatrix} \text{ and } \zeta' = \begin{bmatrix} v \\ w \end{bmatrix})$$

The equation described above is simply an example equation according to an example embodiment for calculating the maximum allowable acceleration, and the processor 120 may calculate the maximum allowable acceleration corresponding to maximum allowable torque through various equations based on the mass of the robot 100 and the radius of the wheel of the robot 100.

In addition, although the equation described above assumes a case where the robot 100 moves through two wheels, the robot 100 may be implemented with a different number of wheels according to an embodiment, and in this case, the equation described above may be different.

Thereafter, the processor 120 may control the driving unit 110 so that the moving speed of the robot 100 reaches the maximum allowable speed based on the maximum allowable acceleration, and perform tasks while moving at the maximum allowable speed.

Accordingly, the disclosure may perform tasks in a corresponding space quickly. In addition, since the disclosure performs tasks within the maximum allowable speed, the tasks may be safely performed.

When changing a driving direction of the robot 100 based on the pre-stored map information, the processor 120 may decrease a moving speed of the robot 100 based on the maximum allowable acceleration described above.

For example, if there is a possibility that the robot 100 collides with a wall based on the pre-stored map information, the processor 120 may decrease the moving speed of the robot 100 based on the maximum allowable acceleration and change the driving direction.

Accordingly, the disclosure may perform a task while moving at a maximum speed for a maximum time in a corresponding space. In addition, the disclosure may prevent and/or avoid collisions while performing tasks quickly.

Figure 4:
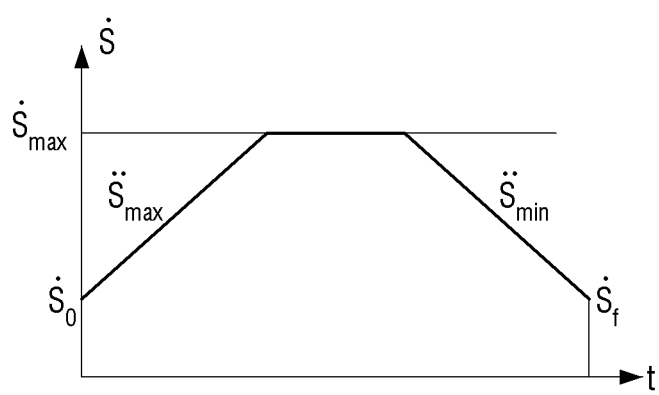
FIG. 4 is a graph illustrating an example moving speed of a robot according to various embodiments.

FIG. 4 is a graph illustrating the moving speed of the robot 100. Referring to FIG. 4, in the disclosure, after reaching the maximum speed with the maximum allowable acceleration, a task is performed at the maximum speed, and if there is a possibility of a collision with an obstacle, it may be seen that the moving speed is reduced with the maximum allowable acceleration.

In the above, an embodiment in which a driving level of the robot 100 is determined based on information on surrounding environment information has been described. However, according to the disclosure, the driving level of the robot may be determined by further considering various information other than surrounding environment information. This will be described in greater detail below with reference to FIGS. 5 and 6.

FIG. 5 is a chart illustrating example information on driving levels for each type of task according to various embodiments.

The processor 120 may identify a driving level corresponding to a task being performed by the robot 100 based on information on a driving level for each type of task.

For this operation, the processor 120 may use pre-stored information on a driving level for each type of task.

For example, referring to FIG. 5, the robot 100 may store information on a driving level for each type of task such that a driving level corresponding to a cleaning task is 3, a driving level corresponding to an object movement is 2, a driving level corresponding to a user movement is 5, and a driving level corresponding to security is 2.

In addition, based on a user command for performing a task of the robot 100 being input, the processor 120 may identify a driving level corresponding to the task of the robot 100 based on information on the driving level for each task type.

For example, based on a user command for performing a cleaning task of the robot 100 being input, the processor 120 may identify the driving level 3 corresponding to the cleaning task as a driving level of the robot 100 based on the information on the driving level for each task type.

In addition, the processor 120 may determine a relatively high driving level among a driving level corresponding to a space in which the robot 100 is located and a driving level corresponding to a task being performed by the robot 100 as the driving level of the robot 100.

For example, based on a user command for performing a cleaning task of the robot 100 in a living room being input, the processor 120 may determine a higher driving level among driving level 1 corresponding to the living room and driving level 3 corresponding to the cleaning task. 3 as the driving level of the robot 100.

As described above, the processor 120 may calculate a maximum allowable acceleration of the robot 100 based on the information on the maximum allowable torque and the maximum allowable speed preset for each driving level, and perform tasks of the robot 100 based on the maximum allowable acceleration.

By determining the driving level of the robot 100 in consideration of the task being performed by the robot 100 together with the space where the robot 100 is located, the disclosure may efficiently and safely perform tasks within the maximum speed allowed for each task.

FIG. 6 is a chart illustrating information on a driving level for each user according to various embodiments.

The processor 120 may identify a driving level corresponding to a user based on information on a driving level for each user.

For this operation, the processor 120 may use pre-stored information regarding a driving level for each user.

For example, referring to FIG. 6, the robot 100 may store information on a driving level for each user such that a driving level corresponding to user A is 1, a driving level corresponding to user B is 2, a driving level corresponding to user C is 5, and a driving level corresponding to user D is 3.

In addition, based on a user command for performing a task of the robot 100 being input, the processor 120 may identify a driving level corresponding to the user based on information on the driving level for each user.

For this operation, the processor 120 may identify users around the robot 100.

For example, the processor 120 may identify a user around the robot 100 by analyzing an image captured by a camera. For example, the camera may be included in a front of the robot 100, as well as may be included in a side and rear of the robot 100.

Various algorithms may be applied to an image analysis method. For example, the processor 100 may recognize a user's face by applying an object recognition algorithm to an image captured through a camera, and identify a user located around the robot 100 among a plurality of pre-stored faces of users. The processor 120 may identify a user located around the robot 100 by applying an artificial intelligence model based on a convolution neural network (CNN) to the image captured by the camera.

The processor 120 may identify a user located around the robot 100 based on a user voice received through a microphone.

For example, when a user voice is received through a microphone, the processor 120 may identify characteristics of the user voice, such as energy of the user voice, a frequency band, and/or a reverberation time (RT) of the user voice. In addition, the processor 120 may identify a user located around the robot 100 by comparing a pre-stored characteristics of a user voice for each user with the characteristics of the user's voice received through the microphone.

The processor 120 may identify a driving level corresponding to the identified user based on the information on the driving level for each user.

For example, if it identified that the user A is located around the robot 100 based on the image captured through the camera or the user voice received through the microphone, the processor 120 may identify the driving level 1 corresponding to the user A as the driving level corresponding to the user.

The processor 120 may determine a relatively high driving level from among the driving level corresponding to the space in which the robot 100 is located and the driving level corresponding to the identified user as the driving level of the robot 100.

For example, when the user A is identified around the robot 100 performing a task in the kitchen, the processor 120 may determine a higher driving level of 2 from among the driving level 2 corresponding to the kitchen and the driving level 1 corresponding to the user A as the driving level of the robot 100.

As described above, the processor 120 may calculate the maximum allowable acceleration of the robot 100 based on the information on the maximum allowable torque and the maximum allowable speed preset for each driving level, and perform tasks of the robot 100 based on the maximum allowable acceleration.

By determining the driving level of the robot 100 in consideration of the user around the robot 100 together with the space where the robot 100 is located, the disclosure may safely perform tasks when an elderly person or a child is located around the robot.

The processor 120 may differently determine the driving level of the robot 100 according to the identified user's location.

For example, when the identified user is located within a preset range from the robot 100, the processor 120 may determine a relatively high driving level from among the driving level corresponding to the space in which the robot 100 is located and the driving level corresponding to the identified user, as the driving level of the robot 100, and when the identified user is located outside the preset range from the robot 100, the processor 120 may determine the driving level corresponding to the space in which the robot 100 is located, as the driving level of the robot 100. Here, the preset range may be variously set or changed according to a user command such as 1 m or the like from the robot 100.

For example, when the identified user is located within a range of 1 m from the robot 100, the processor 120 may determine a relatively high driving level as the driving level of the robot 100 from among the driving level corresponding to the space in which the robot 100 is located and the driving level corresponding to the identified user, and when the identified user is located outside the range of 1 m from the robot 100, the processor 120 may determine the driving level corresponding to the space in which the robot 100 is located, as the driving level of the robot 100.

This is to prevent and/or avoid a case in which the robot 100 performs a task at a slow speed even though the user is located far away from the robot 100 and a possibility of collision between the robot 100 and the user is low. Accordingly, the robot 100 may efficiently perform a task.

Figure 7:
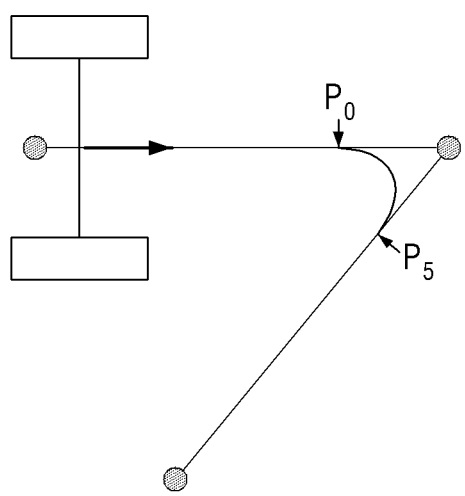
FIG. 7 is a diagram illustrating an example movement trajectory of a robot according to various embodiments.

FIG. 7 is a diagram illustrating an example moving trajectory of a robot according to various embodiments.

As described above, the processor 120 may control a driving unit 110 to reduce a moving speed of the robot 100 based on the maximum allowable acceleration when a driving direction of the robot 100 is changed based on the pre-stored map information.

The processor 120 may change a driving direction of the robot 100 when at least one of an obstacle and a user is detected around the robot 100, and control the driving unit 110 to reduce a moving speed of the robot 100 based on the maximum allowable acceleration.

The processor 120 may control the driving unit 110 to move the robot 100 along a preset trajectory while the robot 100 changes the driving direction.

For example, the processor 120 may control the driving unit 110 to move along a Bezier curve while the robot 100 changes the driving direction. The Bezier curve may refer, for example, to a curve in which at least one additional point is considered in addition to a start point and an end point, and connects from the start point to the end point.

For example, while the robot 100 changes the driving direction, the processor 120 may control the driving unit 110 to move the robot 100 according to a fifth-order Bezier curve. In the case of a trajectory according to the fifth-order Bezier curve, it may be determined based on the following equation.

$$B(t)=(1-t)^5 P_0 + 5t(1-t)^4 P_1 + 10t^2(1-t)^3 P_2 + 10t^3(1-t)^2 P_3 + 5t^4(1-t)P_4 + t^5 P_5 \ (0<t<1)$$

A start point P0 may refer, for example, to a point at which the robot 100 starts to change the driving direction, and an end point P5 may refer, for example, to a point at which the robot 100 starts to drive in a linear direction. In addition, additional points P1 to P4 may be preset based on the distance between the start point and the end point, a radius of the wheel of the robot 100, and may be variously set or changed according to a user command.

The fifth-order Bezier curve is only an example, the robot 100 may be moved through Bezier of various orders, such as a third-order Bezier curve or the like.

Accordingly, the robot 100 may move through the trajectory shown in FIG. 7. Accordingly, compared to a case of changing the driving direction of the robot 100 in a simple circular or linear direction at an inflection point, the disclosure may reduce a vibration of the robot 100 and prevent and/or avoid a case where an acceleration becomes infinite instantaneously, and thus a motor failure may be prevented and/or avoided.

Figure 8:
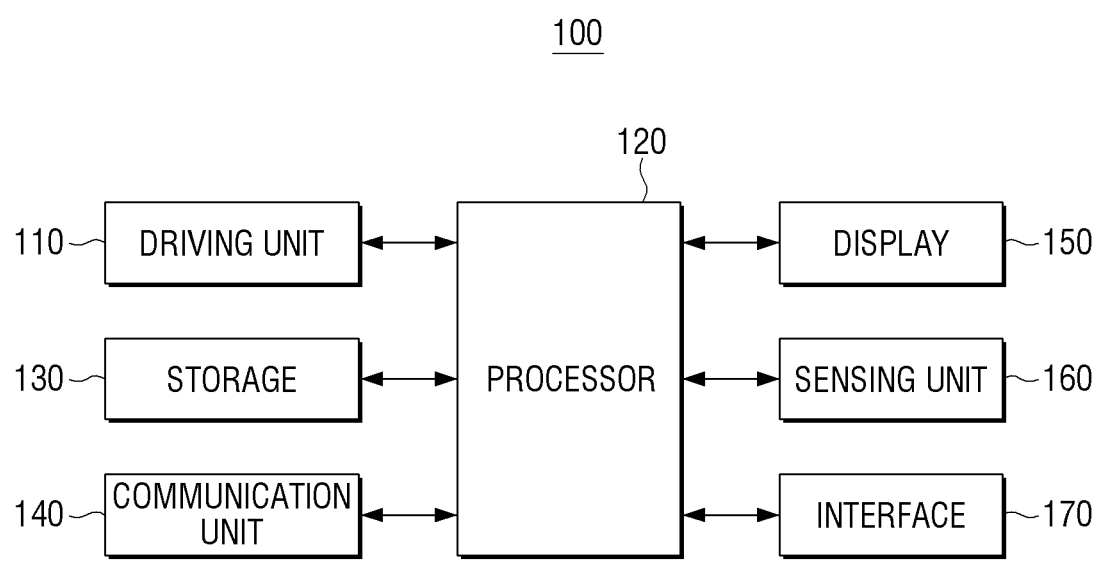
FIG. 8 is a block diagram illustrating an example configuration of a robot according to various embodiments.

FIG. 8 is a block diagram illustrating an example configuration of a robot according to various embodiments.

Referring to FIG. 8, the robot 100 according to an embodiment of the disclosure may include a driving unit (e.g., including a motor) 110, a storage 130, a communication unit (e.g., including communication circuitry) 140, a display 150, a sensing unit (e.g., including a sensor) 160, an interface (e.g., including interface circuitry) 170, and a processor (e.g., including processing circuitry) 120. Hereinafter, a detailed description of the parts overlapping with those described above may not be repeated.

The storage 130 may store various programs and data necessary for operating the electronic apparatus 100. The storage 130 may include, for example, and without limitation, non-volatile memory, volatile memory, flash memory, hard disk drive (HDD), solid state drive (SSD), or the like.

The storage unit 130 may store information on a driving level for each space, information on a driving level for each task type, or information on a driving level for each user. In addition, the storage 130 may store information on the user's face and information on a characteristic of the user's voice. In addition, the storage 130 may store information on a maximum allowable torque preset for each driving level and information on a maximum allowable speed.

The storage 130 may store map information generated according to a driving of the driving unit 110. The map information may include information indicating a moving path of the robot 100, an image form, or trajectory data in a form of coordinates.

Further, the storage 130 may store a plan view of an indoor space received through the communication unit 140. The plan view may include location information and area information for each space.

The communication unit 140 may include various communication circuitry and transmit and receive various data by performing communication with an external device. For example, the communication unit 140 may communicate with an external device through various communication methods such as, for example, and without limitation, Bluetooth (BT), Bluetooth Low Energy (BLE), Wireless Fidelity (WI-FI), Zigbee, or the like.

In addition, the communication unit 140 may receive a user command for performing a task from an external device. Here, the task may be various tasks such as an air purification task, a cleaning task, or moving an object. The external device may be a smartphone or the like, but is not limited thereto.

The display 150 may display various screens. For example, the display 150 may display information related to various functions provided by the robot 100 and/or a user interface for interacting with a user. In addition, the display 150 may display information on the type of a task currently being performed or a degree of progress of the task.

As such, the display 150 may be implemented in various forms such as, for example, and without limitation, a liquid crystal display (LCD), a plasma display panel (PDP), a light emitting diode (LED), an organic light emitting diode (OLED), or the like.

The display 150 may include a touch screen including a touch sensor.

The sensing unit 160 may include various sensors and detect obstacles around the robot 100. For example, the sensing unit 160 may detect a location of an obstacle around the robot 100 and a distance to the obstacle using, for example, and without limitation, a supersonic sensor, an infrared sensor, an RF sensor, or the like. In addition, the sensing unit 160 may further include a collision sensor that detects an obstacle through collision with the obstacle.

The interface 170 may include various interface circuitry including, for example, a plurality of function keys through which a user can set or select various functions supported by the robot 100. The interface 170 may be implemented by a plurality of buttons, or the like, and may also be implemented by a touch screen that can simultaneously perform the function of the display 150.

The interface 170 may receive a command for power control of the robot 100, a command for selecting a task, a command for selecting a task area, or the like.

The robot 100 according to an embodiment of the disclosure may further include a camera (not shown) for photographing a nearby user and a microphone (not shown) for receiving the user's voice.

FIG. 9 is a flowchart illustrating an example method of controlling a robot according to various embodiments.

Based on a user command for performing a task of the robot being input, the robot according to an embodiment may determine a driving level of the robot based on information on surrounding environment information of the robot (S910). The surrounding environment information may include information on a space in which the robot is located, and the robot may identify a space in which the robot is located based on pre-stored map information and identify a driving level corresponding to the space.

In addition, the robot may identify a maximum allowable speed and a maximum allowable torque corresponding to the driving level of the robot based on information on the maximum allowable speed and information on the maximum allowable torque preset for each driving level (S920). For this operation, the robot may use information on the maximum allowable torque and information on the maximum allowable speed which are pre-stored and preset for each driving level.

The robot may calculate the maximum allowable acceleration of the robot based on the maximum allowable torque (S930). For example, the robot may calculate the maximum allowable acceleration corresponding to the maximum allowable torque based on a mass of the robot, a coefficient of friction of a surface in contact with the wheel of the robot, and a radius of the wheel of the robot.

Further, based on the maximum allowable acceleration, the robot may control the robot such that a moving speed of the robot reaches the maximum allowable speed (S940), and control the robot to perform a task while moving at the maximum allowable speed (S950).

Accordingly, the robot may perform a task in a corresponding space quickly. In addition, since the disclosure performs the task within the maximum allowable speed, the task may be safely performed.

The methods according to the above-described example embodiments may be realized as software or applications that may be installed in the existing electronic apparatus.

Further, the methods according to the above-described example embodiments may be realized by upgrading the software or hardware of the existing electronic apparatus.

A non-transitory computer readable medium on which a program sequentially performing the controlling method according to the disclosure is stored may be provided.

The non-transitory computer readable recording medium refers to a medium that stores data and that can be read by devices. For example, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been illustrated and described with reference to various example embodiments, it will be understood that the various example embodiments are intended to be illustrative, not limiting. It will be further understood by those skilled in the art that various modifications, additions and substitutions are possible, without departing from the true spirit and full scope of the disclosure including the accompanying claims and their equivalents. Accordingly, such modifications, additions and substitutions should also be understood to fall within the scope of the disclosure.

What is claimed is:

1. A robot comprising:
a driving unit including a motor; and
a processor configured, based on receiving a command for performing a task of the robot to: determine a driving level of the robot based on surrounding environment information of the robot,
identify, based on information on a maximum allowable torque and information on a maximum allowable speed which are preset for each driving level, a maximum allowable torque and a maximum allowable speed corresponding to the driving level of the robot,
calculate a maximum allowable acceleration of the robot based on the maximum allowable torque,
control the driving unit to move the robot to reach the maximum allowable speed based on the maximum allowable acceleration, and
control the robot to perform tasks while the robot is moving at the maximum allowable speed,
wherein the surrounding environment information of the robot includes information on a space where the robot is located,
wherein the processor is further configured to:
based on information on a driving level for each space, identify a driving level corresponding to a space where the robot is located,
based on an image captured by a camera or a voice received through a microphone, identify a user located within a specified distance of the robot,
based on information on a driving level for each user, identify a driving level corresponding to the identified user,
based on the identified user being located within a preset range from the robot, determine a relatively high driving level as the driving level of the robot, from among the driving level corresponding to the space where the robot is located and the driving level corresponding to the identified user,
based on the identified user being located outside the preset range from the robot, determine the driving level corresponding to the space where the robot is located as the driving level of the robot.

2. The robot of claim 1,
wherein the processor is configured, based on information on a driving level for each task type, to: identify a driving level corresponding to a task being performed by the robot, and determine a relatively high driving level as the driving level of the robot, from among the driving level corresponding to the space where the robot is located and the driving level corresponding to the task being performed by the robot.

3. The robot of claim 1,
wherein the processor is configured, based on a driving direction of the robot being changed based on pre-stored map information, or based on at least one of an obstacle or a user being detected within a specified distance of the robot, to: change the driving direction, and control the driving unit to reduce a moving speed of the robot based on the maximum allowable acceleration while changing the driving direction.

4. The robot of claim 3,
wherein the processor is configured to control the driving unit to move the robot based on a Bezier curve while the robot changes the driving direction.

5. A method for controlling a robot comprising:
based on receiving a command for performing a task of the robot, determining a driving level of the robot based on surrounding environment information of the robot;
identifying, based on information on a maximum allowable torque and information on a maximum allowable speed which are preset for each driving level, a maximum allowable torque and a maximum allowable speed corresponding to the driving level of the robot;
calculating a maximum allowable acceleration of the robot based on the maximum allowable torque;
controlling the robot to move at a moving speed reaching the maximum allowable speed based on the maximum allowable acceleration; and
controlling the robot to perform tasks while the robot is moving at the maximum allowable speed,
wherein the surrounding environment information of the robot includes information on a space where the robot is located,
wherein the determining the driving level includes,
based on information on a driving level for each space, identifying a driving level corresponding to a space where the robot is located,
based on an image captured by a camera or a voice received through a microphone, identifying a user located within a specified distance of the robot,
based on information on a driving level for each user, identifying a driving level corresponding to the identified user, based on the identified user being located within a preset range from the robot, determining a relatively high driving level as the driving level of the robot, from among the driving level corresponding to the space where the robot is located and the driving level corresponding to the identified user, based on the identified user being located outside the preset range from the robot, determining the driving level corresponding to the space where the robot is located as the driving level of the robot.

6. The method of claim 5, wherein the determining the driving level includes, based on information on a driving level for each task type, identifying a driving level corresponding to a task being performed by the robot, and determining a relatively high driving level as the driving level of the robot, from among the driving level corresponding to the space where the robot is located and the driving level corresponding to the task being performed by the robot.

7. The method of claim 5, further comprising:

based on a driving direction of the robot being changed based on pre-stored map information, or based on at least one of an obstacle or a user being detected within a specified distance of the robot, changing the driving direction, and reducing a moving speed of the robot based on the maximum allowable acceleration while changing the driving direction.

8. The method of claim 7, further comprising:

controlling the robot to move based on a Bezier curve while the robot changes the driving direction.

* * * * *